United States Patent [19]

Ruof

[11] Patent Number: 4,568,863

[45] Date of Patent: Feb. 4, 1986

[54] CONTROLLER FOR ELECTRIC BRAKE MOTORS

[75] Inventor: Edgar J. Ruof, Akron, Ohio

[73] Assignee: Goodyear Aerospace Corporation, Akron, Ohio

[21] Appl. No.: 625,346

[22] Filed: Jun. 27, 1984

[51] Int. Cl.⁴ .............................................. H02P 3/16
[52] U.S. Cl. .................... 318/269; 318/261; 318/293; 318/599
[58] Field of Search ............ 318/56, 57, 60, 63, 318/258, 261, 269, 293, 563, 599, 811, 266, 267

[56] References Cited

U.S. PATENT DOCUMENTS

| | | | |
|---|---|---|---|
| 3,561,520 | 2/1971 | Gill | 318/267 X |
| 3,883,786 | 5/1975 | McNaughton et al. | 318/317 |
| 4,146,801 | 3/1979 | Vali et al. | 318/563 X |
| 4,196,377 | 4/1980 | Boxer | 318/269 |
| 4,355,267 | 10/1982 | Franz, Jr. et al. | 318/56 X |
| 4,432,440 | 2/1984 | Crossman | 188/71.2 |
| 4,454,454 | 6/1984 | Valentine | 318/293 |
| 4,467,250 | 8/1984 | Thomasson | 318/436 |
| 4,471,275 | 9/1984 | Comeau | 318/286 |
| 4,479,080 | 10/1984 | Lambert | 318/258 X |

FOREIGN PATENT DOCUMENTS

| | | | |
|---|---|---|---|
| 56-49691 | 5/1981 | Japan | 318/317 |
| 58-36189 | 3/1983 | Japan | 318/293 |

Primary Examiner—William M. Shoop, Jr.
Assistant Examiner—Bentsu Ro
Attorney, Agent, or Firm—P. E. Milliken; L. A. Germain; R. L. Weber

[57] ABSTRACT

A control circuit for regulating the application and release of brake force in an electric brake. A pulse width modulator presents an output signal of regulatable duty cycle to power drivers connected to the electric motors of the brake. A control circuit regulates the direction of current flow through the motors to achieve either brake application or brake release. The output of the pulse width modulator is set by the position of the brake pedal or by a signal which is a function of the correlation between brake torque and the position of the brake pedal, whichever is larger.

10 Claims, 3 Drawing Figures

CONTROLLER FOR ELECTRIC BRAKE MOTORS

TECHNICAL FIELD

The invention herein resides in the art of braking systems, and more particularly to braking systems utilizing electric, rather than hydraulic brakes. Specifically, the invention comprises a control circuit for energizing the drive motors of an electric brake system to achieve either the application or release of brake torque.

BACKGROUND ART

Heretofore, it has been known that the braking of vehicles may be achieved by the transmission of brake force by means of an hydraulic system. While such systems have generally been satisfactory, it is known that there are numerous inherent drawbacks with such systems, particularly with respect to their utilization in aircraft. Obviously, such systems are susceptible to leaks which may, and often do, result in a diminution of braking efficiency. The leaks further tend to allow hydraulic fluid to spread over other elements of the aircraft, thereby collecting undesirable dirt, dust, and the like. Should hydraulic fluid actually reach the disks of the brake disk stack, adverse effects on braking efficiency would result.

It is further known that hydraulic braking systems greatly add to the weight of the aircraft, a most undesirable feature. Further, such systems inherently include an hydraulic lag period between the impulse at the brake pedal and the response at the brake disk. Such a delay in brake signal propagation is, of course, undesirable where aircraft are required to land on runways of fixed length and under all types of adverse weather conditions. In general, the maintenance of hydraulic braking systems has been found to be exceptionally costly and time-consuming.

Electric brake mechanisms have been known in the art by virtue of at least the embodiments presented in U.S. Pat. No. 4,432,440, assigned to Goodyear Aerospace Corporation, the assignee of the invention herein. Suffice it to say for an understanding of the instant application, electric brakes typically utilize one or more reversible electric motors operating in conjunction with a brake disk stack to selectively achieve either engagement or release of the alternately rotating and stationary disks of the stack. Of course, engagement achieves a braking effect, while disengagement results in a release of brake torque.

The instant invention presents a control circuit adapted for implementation with the reversible motors of an electric brake system to achieve the desired application and release of brake torque. While the invention is described with respect to implementation in the braking system of an aircraft, it should be understood that the invention is applicable to braking systems for numerous types of vehicles.

DISCLOSURE OF INVENTION

In light of the foregoing, it is a first aspect of the invention to present a brake controller which is lightweight.

Another aspect of the invention is the provision of a brake controller which is absent any hydraulic elements.

Yet another aspect of the invention is the provision of a brake controller which is both reliable and durable in operation.

Yet an additional aspect of the invention is the provision of a brake controller which is easily implemented with existing electric brake mechanisms.

The foregoing and other aspects of the invention which will become apparent as the detailed description proceeds are achieved by a circuit for controlling the electric motors of an electric brake to selectively achieve the application and release of brake force as a function of brake pedal position, comprising: first means connected to the motors for controlling the rotational direction of the motors; and second means connected to the motors for controlling the amount of electrical current supplied to the motors.

BRIEF DESCRIPTION OF DRAWINGS

For a complete understanding of the objects, techniques, and structure of the invention, reference should be had to the following detailed description and accompanying drawings wherein.

BEST MODE FOR CARRYING OUT THE INVENTION

Figure 1:
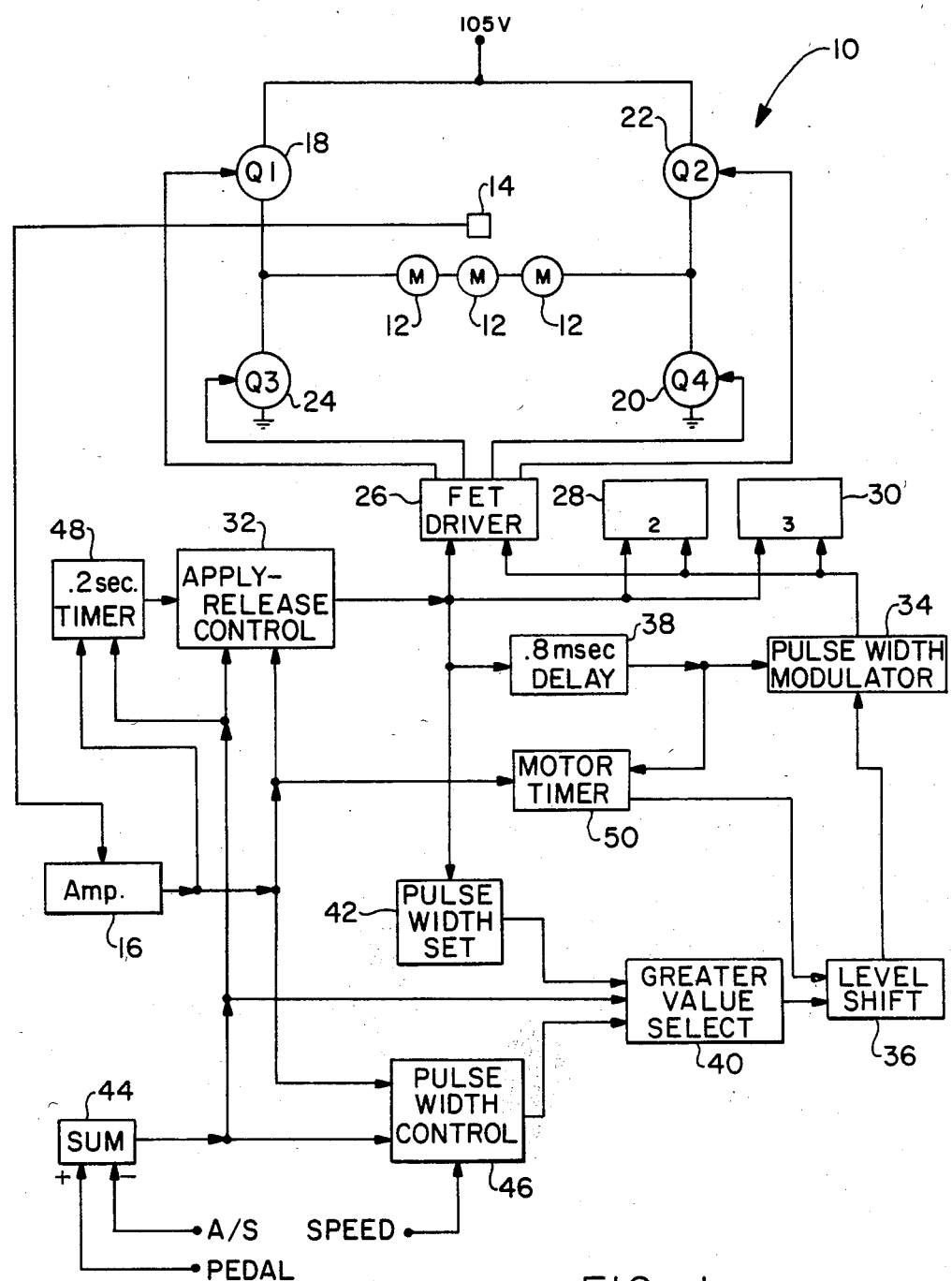
FIG. 1 is a circuit block diagram of the control system of the invention.

Referring now to the drawings and more particularly FIG. 1, it can be seen that a control circuit for energizing and regulating the control motors of an electric brake is designated generally by the numeral 10. As illustrated, the brake for each wheel of the aircraft will include three strings of three reversible motors 12 each, such motors positioned in association with a pressure plate of the brake disk stack so as to achieve the application and release of brake torque. For a specific understanding of the physical positioning of such motors, reference is directed to the aforementioned U.S. Pat. No. 4,432,440. It will, of course, further be understood that any number of motors might be used for achieving the desired brake control. While the instant invention teaches motors connected in strings of three as illustrated, it will further be understood that such groupings of motors does not comprise a particular aspect of the instant invention.

A torque sensor 14 is appropriately associated with each brake assembly, sensing the brake torque actually being developed by the brake disk stack. An amplifier 16 is connected to the sensor 14 for presenting an output signal corresponding to the braking torque. The purpose and function of the torque sensor and amplifier will become further apparent hereinafter.

Field effect transistors 18,20 are provided in interconnection with the motors 12 for purposes of gating current through the windings of the motors 12 in the forward direction to achieve the application of braking force. Release of the braking force is achieved by a reverse drive of the motors 12, effected by oppositely directed current controlled by the paired field effect transistors 22,24. In other words, the transistors 18,20 control the motors in their forward drive mode, while the transistors 22,24 control the current in the reverse drive.

The field effect transistors 18–24 are appropriately controlled by the driver 26. As illustrated in FIG. 1, additional drivers 28,30 could be included for additional strings of braking motors, should the brake require more than three such motors. To facilitate the discussion herein, however, only one such driver 26 is discussed in detail.

Providing a control signal to the driver 26 is the apply-release control circuit 32. The output of this circuit 32 is either high or low, a high output indicating that the motors 12 should be driven in such a direction as to apply the brakes, while a low signal indicates to such driver that the motor should be driven in the opposite direction to release brakes. It should be understood that the brake disk stack must be driven for both application and release of brake force. The release of brake force is not automatically achieved by the termination of the application of brake force. The apply-release circuit 32 therefore gates into conduction the transistors 18,20 for application of brake force, and transistors 22,24 for the release of brake force.

The drive signal to the motors 12, applied by the paired transistors 18,20 and 22,24, is provided from the pulse width modulator 34. The modulator 34 provides a train of output signals of fixed frequency, but of variable pulse width. The pulse width is controlled by the signal applied from the level shift circuit 36 as will be discussed hereinafter. Suffice it to say that the output of the pulse width modulator 34 is of fixed frequency, but of controlled pulse width, such that the duty cycle of the output signal from the modulator 34 may be regulated from full off to full on. Since the pulse width modulator 34 requires a certain amplitude input control voltage, there is provided a level shift circuit 36, the same simply comprising a biasing circuit such that the output control signal to the modulator 34 will be sufficient to achieve the desired control.

Each time the apply-release control circuit 32 dictates a change in direction of rotation of the motors 12, the delay circuit 38 provides an inhibit signal to the pulse width modulator 34 for a fixed time duration. This inhibit signal terminates the output of the pulse width modulator 34 for the period of time that the inhibit signal is present. This time allows the current of the motors 12 to decay before a change in current direction takes place. In a typical system, it has been found that a 0.8 ms time delay from the circuit 38 provides a sufficient time for such current to decay. It will be noted that this inhibit signal is also provided to the motor timer 50 as will be discussed hereinafter.

The output to the level shift circuit 36, which effectively controls the pulse width of the output pulses of the modulator 34, is provided by the greater value select circuit 40. As shown, the circuit 40 has three inputs, the output of the circuit being that signal of the three inputs having the greatest amplitude. It should be noted that the output of the selector circuit 40 is not the sum of the three inputs, but the greatest of the three inputs.

One input to the selector 40 is from the pulse width set circuit 42. The circuit 42 receives the output of the apply-release control circuit 32 and generates an output to the selector 40 only when the output of the circuit 32 dictates reverse rotation of the motors 12. In such case, the circuit 42 provides an output signal of sufficient amplitude to generate a pulse width from the modulator 34 which is of a desired duty cycle. In a preferred embodiment of the invention, it has been found that a fifty percent duty cycle is desirable upon reverse rotation of the motors 12 to achieve release of brake force. However, the specific duty cycle may vary from brake system to brake system. In any event, the pulse width set circuit 42 provides an output signal of sufficient amplitude to assure a strong brake-off current even though, immediately prior to the release of brake force, a low brake-on current was existent. In other words, it is most desirable that when there is an indication of desirability to release brake force, such release is achieved immediately and forcefully. If the brakes were only being lightly applied as by the output signal from the modulator 34 when the determination to release brake pressure was made, the output signal from the modulator 34 might then be insufficient to effectively release brake force. Accordingly, a minimum amplitude release signal is guaranteed by means of the pulse width set circuit 42.

Also providing an input to the greater value select circuit 40 is the summing circuit 44. The circuit 44 presents an output which is the analog sum of its input signals. A first input signal is the pedal signal, indicating the state of depression of the pedal under the pilot's foot. This signal is an indication of the request of braking torque by the pilot. Such a signal may be provided by means of a linear variable differential transformer or the like actually connected to the brake pedal. A second signal to the summing circuit 44 is an antiskid control signal from a standard antiskid control circuit which might be utilized in association with the braking system discussed herein. Since antiskid brake control circuits are well known in the art, the specific structure of the same is not elaborated upon. It will, however, be noted that the antiskid control signal is applied to the negative input of the summer 44 such that the output thereof is, in reality, the difference between the brake pedal signal and the antiskid signal. In normal operation, there is no antiskid signal and the output of the summer 44 would simply be the brake pedal signal from the pilot.

A pulse width control circuit 46 receives as inputs thereto the output of the summer 44 and of the torque amplifier 16. The pulse width control circuit 46 simply seeks to cause the torque signal from the amplifier 16 to be equivalent to the brake pedal signal or output of the summer 44. When the control circuit 46 receives an output from the summer 44, the output of the circuit 46 continues to increase in amplitude until the output of the torque amplifier 16 equals the output of the summer 44. At that point in time, the output of the control circuit 46 continues to increase or decrease, as required, to keep the torque signal equal to the pedal signal or output of the summer 44. Of course, such is the essence of brake control. The braking system seeks to achieve the torque requested by the positioning of the brake pedal. The output of the pulse width control circuit 46 is applied to the greater value select circuit 40 and, if such output signal is the greatest of the three inputs, it controls the pulse width of the output signals of the modulator 34.

It is, of course, desired that a clearance be existent within the brake disk stack to prevent a dragging brake or excessive wear. It should be understood that no torque is developed when the brakes are applied on an aircraft that is stopped or parked. In the absence of a torque signal from the amplifier 16, the brakes would tend to remain applied when pedal release occurs. To prevent this situation, a timer 48 is provided to create an input of fixed time duration to the apply-release control circuit 32 whenever the outputs of the transducer 16 and summing circuit 44 go below a preset minimum value. In other words, when the torque on the brake is below a set level, concurrent with the brake pedal signal being below a set level, the timer 48 is actuated. The timer 48 presents a single output pulse of fixed duration which is generated each time both the torque signal and the sum signal go below the preset minimum. The apply-release control circuit 32, for the duration of such pulse, causes reverse rotation of the brake motors to occur by setting the driver 26 for reverse rotation and by causing the pulse width set circuit 42 to feed a signal into the selector circuit 40 so as to create pulses from the modulator 34 for such a time period. This time period is sufficient to achieve the desired built-in clearance.

A motor timer 50 is also provided to supply control signals to the pulse width modulator 34 through the level shift circuit 36. This motor timer allows motor current to flow for only as long as the pedal force or the torque is changing, plus an additional short period of time to assure that the desired actuation has been accomplished. By so energizing the motors, heat created in the motors 12 is minimized. This is accomplished by causing the output of the modulator 34 to be held at zero except when the motor timer 50 senses a command or a change in braking. It will be appreciated that the high mechanical advantage of the brakes, together with the friction of the drive train, causes the brake clamping action to be sustained even though motor current is cut to zero.

Figure 2:
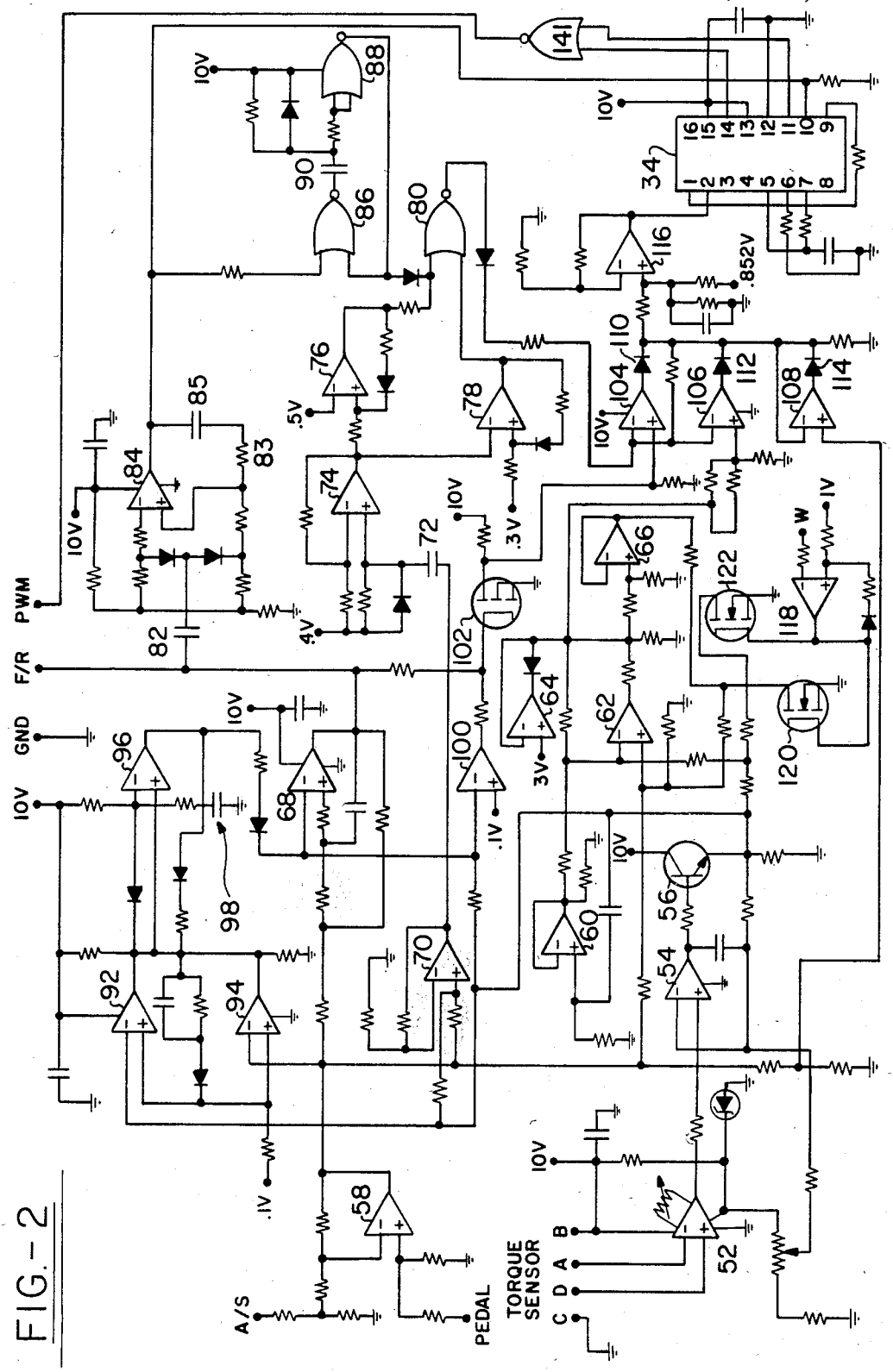
FIG. 2 is a detailed circuit schematic of the current drive circuitry of the invention as the same is interconnected with motors effecting the application or release of brake torque.

With reference now to FIG. 2, the specific structure of the preferred embodiment of the invention can be seen. As illustrated, an amplifier 52 is provided to set the gain of the torque signal as received from the torque sensor 14. The output of the amplifier 52 is passed to a second stage amplifier 54, again provided with appropriate gain to provide a usable signal therefrom indicative of the instantaneous torque achieved by the associated brake. Further drive is provided by means of the output transistor 56 as is readily known to those skilled in the art. It will be appreciated that the circuit elements 52-56 and their associated gain control resistors principally comprise the torque amplifier circuit 16 as depicted in FIG. 1. It will further be noted that the summer 44 principally comprises the summing amplifier 58, having the pedal signal applied at the positive input thereof, and the antiskid signal at the negative input thereof. Accordingly, the output of the summing amplifier 58 is the pedal signal as modified by any existent antiskid signal. As discussed earlier, under typical operating conditions, the antiskid signal would be absent and the output of the amplifier 58 would therefore simply be the brake pedal signal.

A differentiator 60 receives the torque signal and, by taking the differential thereof, determines the rate at which the instantaneous torque changes. This signal is summed with the torque signal at the negative input of the amplifier 62, the positive input to which is the output of the summing amplifier 58. Accordingly, the output of the amplifier 62 is typically a signal having an amplitude corresponding to the difference between the torque signal and the pedal signal. A clamp 64 is provided to limit the output of the amplifier 62, while an amplifier 66 is provided in a feedback loop to the positive input of the amplifier 62. The output of the amplifier 62 comprises the output of the pulse width control circuit 46 of FIG. 1. As is apparent to those skilled in the art, this output will rise in amplitude until the voltage from the torque sensor provided at the negative input thereof is equivalent to the brake pedal signal applied to the positive input. The output of the amplifier 62 will rise or fall to maintain such equality at the inputs as the output of the amplifier 62 effects the braking action.

It should further be noted that amplifier circuits 62,66 cause the output of the pulse width modulator to obtain maximum width whenever the output of the summing amplifier 58 is greater than a set percentage of the torque signal. Such percentage is set by the ratio of the input resistors to the amplifier 66. Accordingly, the pulse width modulator demands maximum motor current until the torque signal comes within a set percentage of the output of the summing amplifier 58, assuring fast response by the motors 12.

The apply-release control circuit 32 of FIG. 1 consists primarily of the amplifier 68, functioning as a comparator. The amplifier 68 receives the torque signal at the negative input thereof, and the brake pedal signal at the positive input thereof. Accordingly, when the brake pedal signal exceeds the torque signal, a positive output is emitted, directing that the motors 12 be rotated in the forward direction to apply brake force. In similar fashion, when the torque signal exceeds the brake pedal signal, the output of the comparator 68 is at a low level, directing that the motors 12 be operated in the reverse direction to release brake force.

An amplifier 70, receiving the torque and brake pedal signals at the positive input thereof, provides an output to the motor timer circuit which is equivalent to the average of the torque and brake pedal signals. The output is coupled via the capacitor 72 to the amplifier 74 of the motor timer 50. Any change in torque or brake pedal signal is accordingly coupled to the amplifier 74. This amplifier has a biased input at the mid-range of reference voltages which are applied to the subsequent comparators 76,78. The comparator 76 accordingly provides a positive output if the output of the amplifier 74 is above the reference set at the negative input thereof. In similar fashion, the comparator 78 provides a positive output if the output of the amplifier 74 is below the reference set at the positive input thereof. Accordingly, there is a low level output signal from the NOR gate 80 anytime there is a change in either the pedal signal or the torque signal.

As shown, the delay circuit 38 principally comprises the amplifier 84, receiving at the inputs thereof the output of the comparator 68 via the coupling capacitor 82. Accordingly, there is presented to the inputs of the amplifier 84 a signal each time the motor rotation is to change from forward to reverse or from reverse to forward. In other words, each time that braking activity changes, a pulse is emitted from the amplifier 84 having a time duration dependent upon the feedback resistor and capacitor 83,85. This signal is applied to the pulse width modulator 34 to kill the output signal therefrom for such time duration while the residual current in the motors 12 dies down.

The output of the amplifier 84 is also supplied to the circuitry comprising logic gates 86,88 and capacitor 90. This circuit constitutes a timer, adding a short duration signal to the output of the NOR gate 80 on each change of the output of the apply-release control circuit 32.

The timer 48 consists essentially of the amplifiers 92-96. The amplifiers 92 and 94 respectively receive the torque and brake pedal input signals at the negative inputs thereof, such that any time the torque or brake pedal signals fall below the threshold set at the positive inputs thereof, a signal of fixed time duration is emitted from the amplifier 96. It will be understood that the time duration is set by the resistor-capacitor network 98 connected to the negative input of the amplifier 96. As discussed above, this timer allows for the establishment of the built-in clearance in the brake disk stack.

The amplifier 100 receives the torque signal at the negative input thereof. The positive input is connected to a threshold level. Should the torque signal drop below the threshold at the positive input, the amplifier 100 presents a positive output to the gate of the field effect transistor 102. Also provided at the gate of the field effect transistor 102 is the output of the apply-release control circuit 32. Accordingly, the transistor 102 turns on any time there is low torque or a signal indicating reverse drive of the motors. This output is applied to the greater value select circuit 40, comprising amplifiers 104,106,108. As noted, the outputs of the amplifiers are wire-ORed together via diodes 110,112,114. As noted, the input to the amplifier 104 is the output of the pulse width set circuit 42 as applied via the field effect transistor 102. The input to the amplifier 106 is the output of the pulse width control circuit 46, comprising the output of the amplifier 62. Finally, the input to the amplifier 108 is part of the output of the summer 44, constituting the output of the summing amplifier 58. Such part or percentage is determined by the voltage divider interposed between the output of amplifier 58 and the input of amplifier 108. It should be noted that the outputs of the amplifiers 104 and 106 may be inhibited by the output of the NOR gate 80 as discussed hereinabove.

In any event, by virtue of the interconnection of the outputs of the amplifiers 104–108 via the diodes 110–114, the output of the greater value select circuit 40 is the output of that amplifier having the greatest amplitude. This output is passed to the level shift circuit comprising the amplifier 116, appropriately biased at the inputs thereof to achieve a signal of appropriate amplitude for application to the pulse width modulator 34.

It should be observed that an amplifier 118 is provided to receive at the negative input thereof a signal corresponding to the instantaneous rotational speed of the wheel. The positive input is set at a fixed threshold level. When the wheel speed drops below the reference, field effect transistors 120,122 are gated into conduction. The field effect transistor 122 gates to ground a portion of the torque signal. In similar fashion, the field effect transistor 120 alters the gain associated with the brake pedal signal. The result is when the wheel speed drops below a particular speed, for example ten miles per hour, the output of the pulse width control circuit 46 is equal to the brake pedal signal minus a selected percentage, for example one-half, of the torque signal. This prevents the output of the pulse width control circuit 10 from going to full value as it otherwise would do when the wheels are not turning and the torque signal cannot rise to equal the brake pedal signal.

Figure 3:
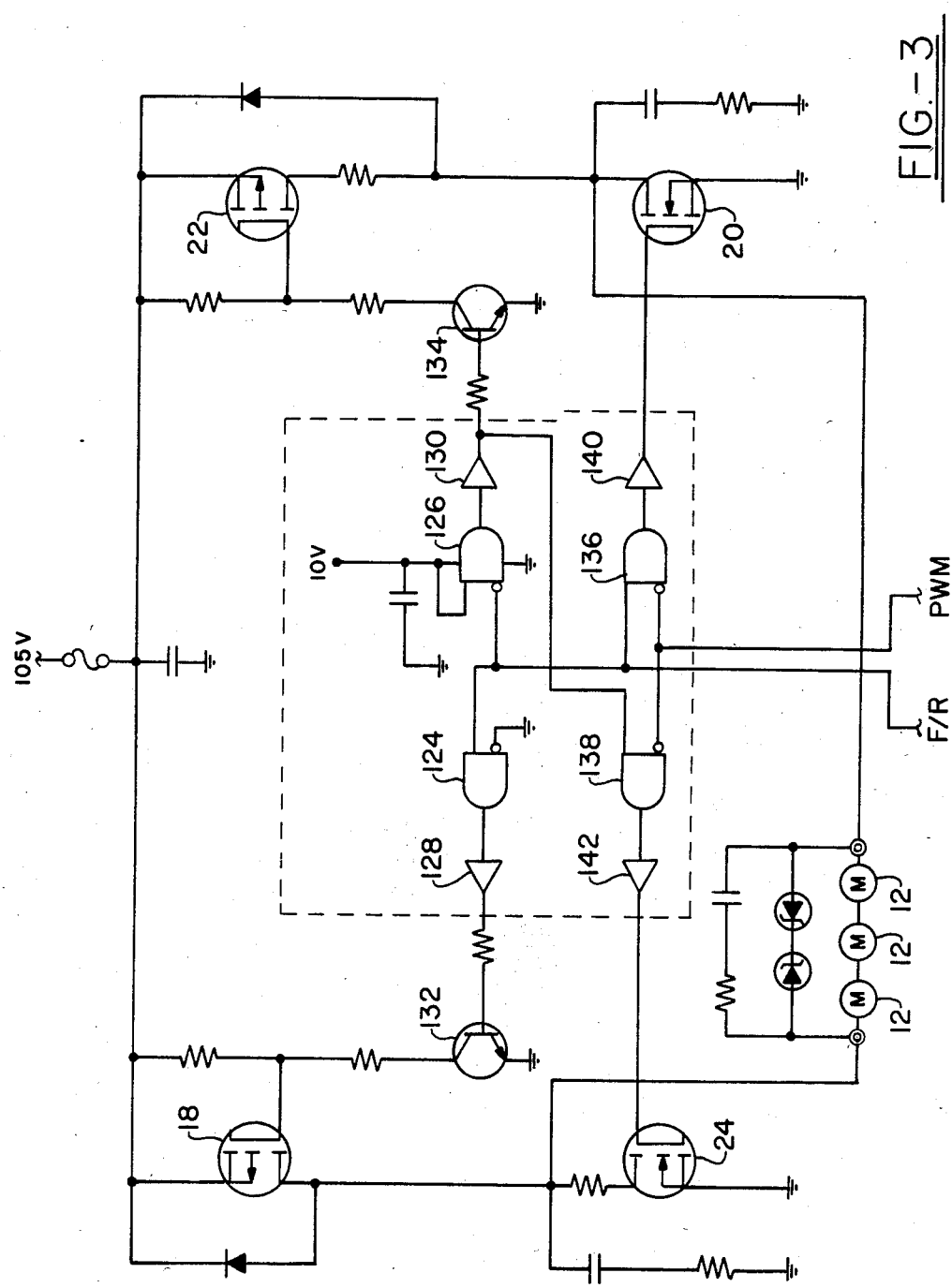
FIG. 3 is a detailed circuit schematic of the control circuitry of the invention.

The motor drive circuitry of the invention is shown in schematic detail in FIG. 3. More particularly, the driver circuit 26 is here shown in association with the field effect transistors which regulate the direction and drive of the motors 12. It will be seen that the output of the amplifier 68 of the apply-release control circuit 32 is applied to the non-inverting inputs of the AND gates 124 and 136 as well as to the inverting input of the AND gate 126. Accordingly, when the motors are to be driven in the forward direction, a high level signal passes through the AND gate 124 and driver 128 to turn on the transistor 132. This in turn gates the field effect transistor 18 into its conducting state. At the same time, the low level input signal on the non-inverting input of the AND gate 138 causes a low level signal to pass from the gate 138 and driver 142 to hold the field effect transistor 24 in a non-conducting state. Similarly, the field effect transistor 22 is held in a non-conducting state by virtue of the application of the high level signal to the inverting input of the AND gate 126. This signal causes the output of the AND gate 126 and the driver 130 to be at a low state, keeping the transistor 134 turned off, and correspondingly keeping the field effect transistor 22 in its non-conducting state. However, the high level output of the amplifier 68 is applied to the non-inverting input of the AND gate 136 such that the output pulses of the NAND gate 141 pass through the AND gate 136 and driver 140, to the gate of the field effect transistor 20. Accordingly, the transistor 20 is gated on and off as a direct function of either output of the modulator 34. The result is an application of current through the string of motors 12 which is controlled by the output of the pulse width modulator 34. In this current path, the motors are caused to rotate in a forward direction, achieving the application of brake force.

At this point it should be noted that the pulse width modulator 34 has two outputs, not just one, which alternately produce identical positive pulses. These identical positive pulses are applied as shown to the inputs of NOR gate 141 to produce a train of negative-going pulses at its output. These negative-going pulses are applied to the inverting inputs of gates 138 and 136 as discussed above.

The release of brake force is achieved when the output of the apply-release control circuit 32 is at a low level, turning off the transistor 132 and turning on the transistor 134. The field effect transistor 22 is thus gated to a conducting state. The field effect transistor 20 is inhibited by the output of the AND gate 136 and the driver 140. With a high level signal provided at the non-inverting input of the AND gate 138, that gate passes the output pulses of the NOR gate 141 through the driver 142 to the gate of the field effect transistor 24. The string of motors 12 are thus provided with a path from a power source to ground through the field effect transistors 22 and 24. The amount of current passed is, of course, controlled by the outputs of the pulse width modulator 34, via NOR gate 141, as it gates the transistor 24 on and off. As will be noted, the current path through the string of motors 12 is reversed from that when the field effect transistors 18,20 were gated for conduction.

It should now be apparent that there has been provided a control circuit for the electric motors of an electric brake system. The direction and amount of drive given the motors to achieve brake force application or release is controlled by the brake pedal actuation of the pilot. The brakes seek to achieve the torque demanded by the position of the pedal. Means have been provided to assure that, upon the release of brakes, sufficient current drive is available to the motors to assure that the release is achieved. Further means have been provided for proper braking control during taxiing or low speed operation.

While in accordance with the patent statutes only the best mode and preferred embodiment of the invention has been presented and described in detail, it is to be understood that the invention is not limited thereto or thereby. For an appreciation of the true scope and breadth of the invention reference should therefore be had to the following claims.

What is claimed is:

1. A circuit for controlling the electric motors of an electric brake to selectively achieve the application and release of brake force as a function of brake pedal position, comprising:
   first means connected to the motors for controlling the rotational direction of the motors;
   first circuit means connected to said first means and presenting an output signal of fixed amplitude each time said first means directs reverse rotation of the motors to achieve brake release;
   second means connected to the motors for controlling the amount of electrical current supplied to the motors, said second means comprising a pulse width modulator presenting an output signal of selectable duty cycle, such duty cycle being controlled by an input signal to said pulse width modulator;
   second circuit means interposed between the pedal and said first and second means for presenting a brake pedal output signal indicative of brake pedal position to said first and second means;
   third circuit means interconnected between said first and second means for inhibiting operation of said second means upon a change in output of said first means;
   a torque sensor operatively connected to the brake and presenting a torque output signal indicative of the torque generated by the brake; and
   fourth circuit means connected to said torque sensor and said second circuit means and presenting an output signal as a function of the correlation between said torque output signal and said brake pedal output signal.

2. The circuit according to claim 1 which further includes a selector circuit receiving the brake pedal output signal from said second circuit means, the output signal of said first circuit means, and providing that signal of greatest amplitude to said pulse width modulator as said input signal to said pulse width modulator.

3. The circuit according to claim 2 wherein said second circuit means comprises a summer, receiving as inputs thereto an antiskid signal and a signal indicative of the position of the brake pedal.

4. The circuit according to claim 1 which further includes a timer connected to said torque sensor and second circuit means, and presenting an output of fixed time duration to said first means each time said torque output signal and brake pedal output signal both drop below preset levels.

5. The circuit according to claim 4 which further includes a motor timer connected to said pulse width modulator and inhibiting said output signal of said pulse width modulator except when the brake torque or the brake pedal position is changing.

6. The circuit according to claim 1 wherein said second means comprises a pulse width modulator mutuallly exclusively controlling pairs of transistors to achieve passage of current through the motors in a first direction for brake application and in a second direction to achieve brake release.

7. A controller for the motors of an electric brake, comprising:
   current drivers connected to said motors for passing electrical current therethrough;
   a pulse width modulator connected to said current drivers and regulating the amount of current passed thereby;
   a switching circuit connected to said current drivers and selectively directing the flow of current in one of two directions through said motors;
   a torque sensor connected to the brake and providing a torque output signal indicative of the instantaneous brake torque, and means for producing a brake pedal output signal corresponding to the instantaneous position of a brake pedal associated with the brake;
   first circuit means receiving said torque and brake pedal output signals and supplying a control signal to said pulse width modulator as a function of the correlation between said torque and brake pedal output signals;
   second circuit means connected to said switching circuit for presenting to said pulse width modulator a signal of fixed amplitude when the output of said switching circuit is indicative of a release of brake force; and
   a selector circuit receiving said brake pedal output signal, said control signal, and said signal of fixed amplitude, and applying to said pulse width modulator the largest of said three signals.

8. The controller according to claim 7 which further includes a delay circuit interposed between said pulse width modulator and said switching circuit, inhibiting the output of said pulse width modulator for a fixed time period upon the change of direction of current flow by said switching circuit.

9. The controller according to claim 7 wherein said means for producing a brake pedal output signal comprises a summer receiving an antiskid signal as an input thereto.

10. A controller for the motors of an electric brake, comprising:
   current drivers connected to said motors for passing electrical current therethrough;
   a pulse width modulator connected to said current drivers and regulating the amount of current passed thereby;
   a switching circuit connected to said current drivers and selectively directing the flow of current in one of two directions through said motors;
   a torque sensor connected to the brake and providing a torque output signal indicative of the instantaneous brake torque, and means for producing a brake pedal output signal corresponding to the instantaneous position of a brake pedal associated with the brake; and
   wherein said means for producing a brake pedal output signal comprises a summer receiving an antiskid signal as a input thereto.

* * * * *

UNITED STATES PATENT OFFICE
CERTIFICATE OF CORRECTION

Patent No. 4,568,863                     Dated February 4, 1986

Inventor(s) Edgar J. Ruof

It is certified that error appears in the above-identified patent and that said Letters Patent are hereby corrected as shown below:

Column 9, line 42, after "said second circuit means," add --the output signal of said fourth circuit means, and--

Signed and Sealed this

Thirteenth Day of May 1986

[SEAL]

Attest:

DONALD J. QUIGG

Attesting Officer          Commissioner of Patents and Trademarks